United States Patent
Moffatt

(10) Patent No.: US 8,372,667 B2
(45) Date of Patent: Feb. 12, 2013

(54) FIBER LASER SUBSTRATE PROCESSING

(75) Inventor: Stephen Moffatt, St. Brelade (JE)

(73) Assignee: Applied Materials, Inc., Santa Clara, CA (US)

(*) Notice: Subject to any disclaimer, the term of this patent is extended or adjusted under 35 U.S.C. 154(b) by 236 days.

(21) Appl. No.: 12/761,306

(22) Filed: Apr. 15, 2010

(65) Prior Publication Data

US 2010/0267173 A1   Oct. 21, 2010

Related U.S. Application Data

(60) Provisional application No. 61/171,011, filed on Apr. 20, 2009.

(51) Int. Cl.
*G01R 31/26* (2006.01)
*H01L 21/66* (2006.01)

(52) U.S. Cl. .............. 438/16; 219/121.6; 250/492.2; 438/795

(58) Field of Classification Search .......... 438/16; 219/121.6; 250/492
See application file for complete search history.

(56) References Cited

U.S. PATENT DOCUMENTS

| 7,519,252 B2 | 4/2009 | Morita et al. | |
| 2006/0078675 A1* | 4/2006 | Kumar et al. | 427/248.1 |
| 2006/0237404 A1 | 10/2006 | Ishikkawa et al. | |
| 2007/0212859 A1* | 9/2007 | Carey et al. | 438/487 |
| 2008/0025363 A1* | 1/2008 | Yla-jarkko et al. | 372/98 |

FOREIGN PATENT DOCUMENTS

JP  2007-088050 A  4/2007

OTHER PUBLICATIONS

Olander et al., "Laser Assisted Atomic Layer Deposition of Boron Nitride Thin Films", Chem, Vap. Deposition 2005, 11, 330-337.*
International Search Report for PCT application PCT/US2010/031632 (Oct. 29, 2010).

* cited by examiner

*Primary Examiner* — Leonard Chang
(74) *Attorney, Agent, or Firm* — Kilpatrick Townsend & Stockton LLP

(57) ABSTRACT

Embodiments of the present invention pertain to substrate processing equipment and methods incorporating light sources which provide independent control of light pulse duration, shape and repetition rate. Embodiments further provide rapid increases and decreases in intensity of illumination.

17 Claims, 6 Drawing Sheets

FIBER LASER SUBSTRATE PROCESSING

CROSS-REFERENCE TO RELATED APPLICATIONS

This application claims the benefit of U.S. Provisional Application No. 61/171,011, filed Apr. 20, 2009, which is incorporated herein by reference in its entirety for all purposes.

BACKGROUND OF THE INVENTION

In some processes used in the semiconductor industry, it is desirable to heat a substrate rapidly to reduce the time it takes to process the substrate. Typically, rapid thermal processing systems utilize a high intensity light source to rapidly heat a substrate that is held within a processing chamber, sometimes under vacuum conditions. The high intensity light source, which may consist of an array of high intensity lamps, is located inside the chamber or outside of the chamber and adjacent to a transparent window through which the light passes into the chamber. Inside of the chamber the substrate is supported with very little physical contact (usually around the edge) so the substrate temperature can respond quickly to the incoming light. The front of the wafer is exposed and receives light from the high intensity lamps. The lamps are essentially black-body radiators and are heated as quickly as possible (typically 300 to 500 ms) to operating temperature. For many substrates, like silicon substrates as commonly used in the manufacture of integrated circuits, optical absorption is higher for shorter wavelengths especially at the beginning of a heating cycle when the substrate is closer to room temperature. Rapid silicon substrate heating begins after the lamps reach high temperatures (about 3000° C.) at which time the lamps begin emitting a significant portion of short wavelength light.

FIG. 1 shows a schematic cross-sectional view of a flood type rapid thermal heating apparatus in which a wafer 100 disposed in chamber 105 is heated by radiation from lamps 125 mounted on a chamber lid 120. The lamps 125 are typically tungsten-halogen lamps and may be brought to different temperatures to evenly heat the substrate. Pyrometry measurements may be made by monitoring light through windows 135 in the chamber 105. The rate with which the lamps 125 can be turned on and off is limited with typical heat lamps and results in limitations on how fast a substrate can be heated.

Alternative light sources have been used to overcome some of these limitations and to provide short pulse durations in order to stay within processing time targets. However these new alternative light sources are not optimal to satisfy new processing requirements that include time requirements for processing wafers that have been decreased to be between 50 nsec and 100 μs. Therefore, a system and method for reliably and rapidly processing wafers using heating pulses below about 100 ns is needed. Additional control of the initiation and termination as well as duration and repetition rate of high intensity pulses of illumination is needed for a variety of substrate processes.

BRIEF SUMMARY OF THE INVENTION

Embodiments of the present invention pertain to substrate processing equipment and methods incorporating light sources which provide independent control of light pulse duration, shape and repetition rate. Embodiments further provide rapid increases and decreases in intensity of illumination.

A substrate processing system includes one or more fiber lasers that generate optical pulses for illuminating a portion of a surface of the semiconductor substrate to modify the semiconductor substrate. The optical pulses include one or more wavelengths of light and a selectable pulse duration. The portion of the surface has an area greater than ten square millimeters. The optical pulses can promote chemical reactions which result in the formation of a film on a surface of the semiconductor substrate. Alternatively, the optical pulses can activate dopants in the semiconductor substrate. Alternatively, the optical pulses can anneal the semiconductor substrate. The one or more fiber lasers can include at least one fiber bundle laser. The pulse duration can be between about 100 ns and about 100 μs. The optical pulses can be used to modify the semiconductor substrate by heating the semiconductor substrate or diffusing atoms in the semiconductor substrate. The repetition rate of the optical pulses can be selectable and can be less than about 1 MHz. The substrate processing system further includes an optical pyrometry assembly to monitor radiation from the portion of the surface near a wavelength different from the one or more wavelengths of the one or more fiber lasers.

A substrate processing system includes the optical assembly and a substrate support assembly for supporting a substrate disposed within a processing chamber. The substrate support assembly of the substrate processing system can be moveable relative to the one or more fiber lasers. The one or more fiber lasers of the substrate processing system can be moveable relative to the substrate support assembly.

A method of treating a substrate includes selecting a pulse duration of at least one optical pulse that promotes a surface process and illuminating a first portion of a surface of the substrate with the at least one optical pulse of light. The one optical pulse of light includes one or more fiber laser wavelengths emitted from an output of a fiber laser assembly and the portion of the surface has an area greater than ten square millimeters. The method can include moving the substrate and illuminating a second portion of the surface of the substrate. The method can include receiving an emitted light from the first portion of a surface of the substrate and determining an intensity of the emitted light near a process monitoring wavelength. The process monitoring wavelength can be different from the one or more fiber laser wavelengths.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of the invention may be realized by reference to the remaining portions of the specification and the drawings, presented below. The Figures are incorporated into the detailed description portion of the invention.

Figure 1:
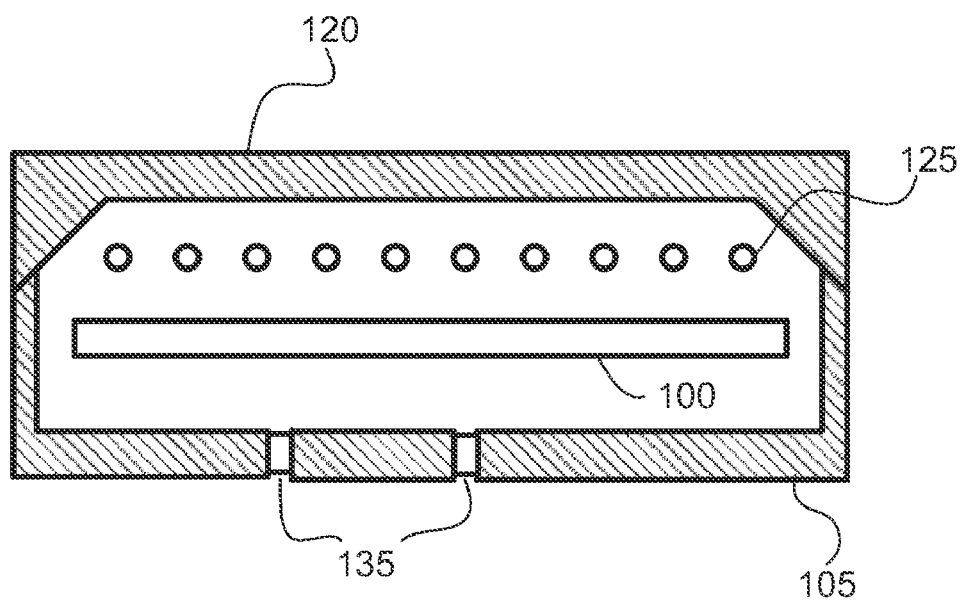
FIG. 1 is a cross-sectional schematic of a heating and monitoring system in a prior art substrate processing system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present invention pertain to substrate processing equipment and methods incorporating light sources which provide independent control of light pulse duration, shape and repetition rate. Embodiments further provide rapid increases and decreases in intensity of illumination.

In a disclosed embodiment, fiber lasers are used to illuminate and heat the surface of a substrate to process the near surface region of the substrate. The processes include forming films, treating dopants and reordering the substrate itself. Fiber lasers can be used to create very intense optical pulses enabled by long lasing cavities which can be coiled to maintain a small tool footprint. The long narrow lasing cavities of fiber lasers can be cooled very efficiently further enabling a high optical intensity output. Continuous power from currently available fiber lasers exceed 1 kWatt which translates to very high peak powers depending on repetition rate, number of pulses, pulse shape and duration. Fiber lasers, when pumped by a master fiber oscillator instead of a pulsed Nd:Yag laser, offer greater range for these parameters and also enable parameters to be selected more independently from one another. Multiple fiber lasers may be combined to form a class of lasers known as fiber bundle lasers.

The surface of the substrate may be treated with optical pulses having essentially continuously tunable pulse durations between about 2 ns and about 100 µs. Pulse trains may be used to treat the surface of the substrate with a selectable number of pulses and pulse repetition rates of up to 1 MHz. The shape of an optical pulse may be adjusted to provide, for example, more illumination initially to heat a surface to a process-assistive temperature and then descend to a lower intensity sufficient to maintain a process reaction. For long pulses (over 100 µs) the pulse shape may be selected to ramp intensity in order to limit the difference in expansion between the top and bottom of a substrate. Pulse shape engineering or "pulse shaping" is facilitated by the use of fiber lasers which can provide flexibility in pulse shape analogous to arbitrary electrical waveform generators. Optical pulse shapes may be chosen to promote chemical reactions involved in the growth of a specific film.

Depending on the chemistries involved, illuminating a surface in the presence of gas precursors can enhance the rate of chemical reactions by other than thermal means. For example, the light may excite gas phase molecules, adsorbed molecules, or even electronically excite the substrate to promote a chemical reaction on the surface. Pertinent photo-induced processes include photo-catalysis and photo-assisted atomic layer deposition (PA-ALD), during which pulse trains may be used to grow on a substrate one layer of a film per pulse. The wavelength of the fiber laser may be selected to promote desirable film processes by, for example, choosing a wavelength which is resonant with a molecular electronic transition which enhances a reaction rate. The wavelength may be chosen to enhance absorption of the radiation by the substrate, thereby heating the substrate more efficiently.

Pulsed fiber lasers are made by doping a core of an optical fiber, which is then used as the laser cavity. The laser cavity core may be optically pumped with a laser whose light is directed through the laser cavity core and, for high intensity applications like this one, through a secondary undoped core bordering or surrounding the laser cavity core. The laser cavity core may be doped with rare-earth elements to facilitate stimulated emission but other optical effects also provide mechanisms for optical gain. Improvements in the design of these high intensity lasers have made possible new applications like removing material from workpieces (e.g. scribing, cutting and ablating). These applications require the beam to be focused to a small spot size in order to achieve enough heat to remove material. In embodiments of the present invention, fiber lasers are incorporated into substrate processing equipment to process substrates, in part, by broadening the beam optically so the output illumination is able to cover a significant portion of a substrate. Substrate processing applications require a lower power density than melting or ablating so current power levels of greater than about 10 Watts may be sufficient for many processes. Multiple lasers may be combined in order to cover an even larger portion of a substrate allowing the whole substrate to be exposed at one time or smaller regions to be exposed with a scanning motion or in discrete steps. Relative motion between the output of the fiber laser and the substrate may be provided by motion of the substrate, motion of the output of the fiber laser or a combination thereof.

Figure 2A:
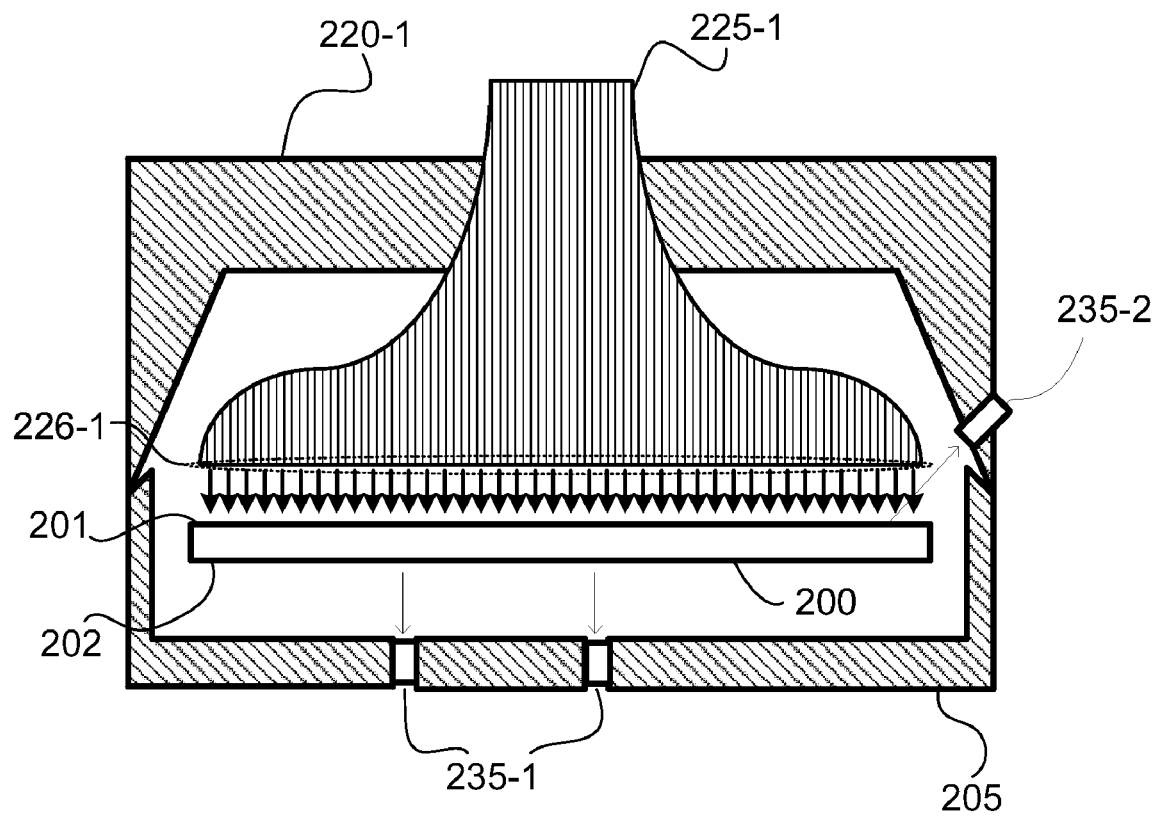
FIGS. 2A-2C are cross-sectional schematics of heating and monitoring systems in a substrate processing system according to embodiments of the invention.
Figure 2B:
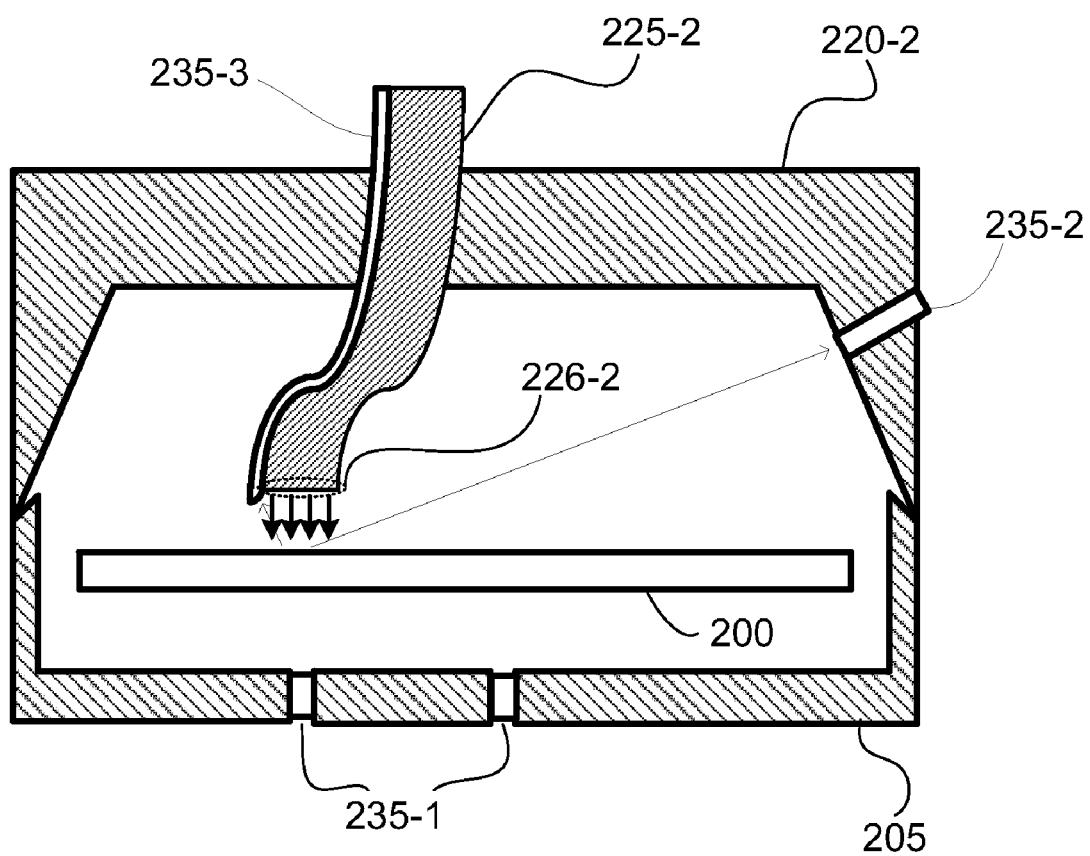
Figure 2C:
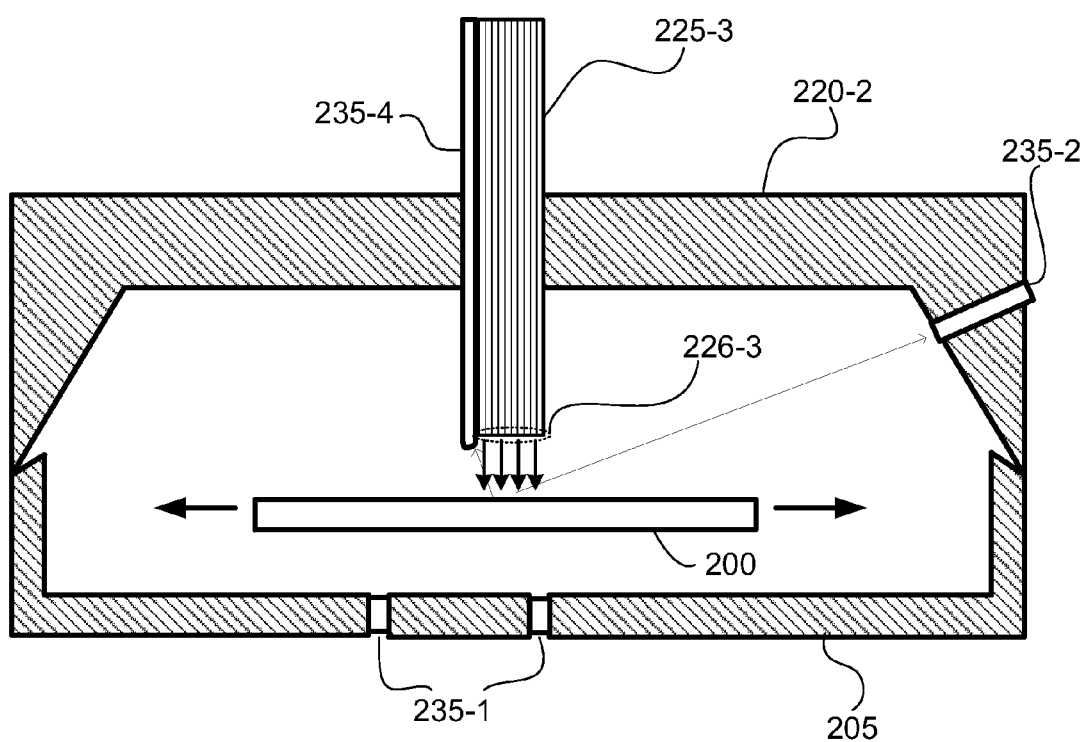

In order to better understand and appreciate the invention, reference is made to FIGS. 2A-2C which are cross-sectional schematics of heating and monitoring systems in a substrate processing system according to embodiments of the invention. FIG. 2A shows a processing system into which light is passed through fiber optic cabling 225-1 into the chamber and spread across a substrate 200 to process the surface without relative motion between the output of the fiber laser assembly 226-1 and the substrate 200.

For pulses below about 20 milliseconds in duration, the substrate may not be the same temperature at the top surface 201 and bottom surface 202 until after the pulse is terminated. Optical measurements of the thermal response to illumination may therefore be preferably performed on the top surface 201 which is directly illuminated and heated. Monitoring the top surface 201 may be done through a transparent optical aperture 235-2 aimed at the surface of substrate 200 rather than through the transparent optical apertures 235-1 aimed at the bottom surface 202. The processing system shown is configured with the transparent optical aperture 235-2 as part of the lid 220-1 which also supports the fiber optic cabling 225-1. The thermal response of the top surface 201 of substrate 200 may be monitored by pyrometry at a wavelength different from the wavelength(s) of light emitted from the fiber laser(s) to improve the accuracy of a temperature determination. Detecting a different wavelength can reduce the chance that illumination reflected or scattered from the fiber laser will be misinterpreted as being thermally generated from the top surface of substrate 200.

Since pulses from the fiber laser may be as short as 2 nanoseconds, the light detected by a pyrometer may not be indicative of an equilibrium temperature of the surface. Further processing may be required in order to determine the actual temperature of the surface during or after the exposure. Alternatively, the raw optical signal may be used and correlated to optimum properties of the resulting film, dopant or other surface characteristics.

In FIG. 2A the fiber laser assembly 226-1 outputs light inside the processing chamber. In an alternative embodiment, the fiber laser output 226-1 may be located outside the processing chamber and light is passed into the chamber through a transparent window. In another alternative embodiment, the fiber laser output 226-1 may occupy a separate portion of the chamber where it is still protected from process conditions. Separating the output of the fiber laser 226-1 from the processing region has the additional advantage of preventing deposition, etching or other reactions which adversely affect the efficiency of transmission of optical radiation through to the surface of substrate 200.

The fiber laser may produce light of short wavelength (<0.75 μm or <0.5 μm in embodiments) while making pyrometry measurements at a higher wavelength (between about 0.5 μm and 1.2 μm or 0.75 μm and 1.2 μm) in order to separate heating wavelengths from monitoring wavelengths. The emissivity of silicon substrates is low for wavelengths above 1.2 μm for most dopant concentrations, making pyrometry measurements more difficult. For substrates other than silicon, the ranges of wavelengths may be different but the benefits of using different wavelengths of light for heating and making pyrometric measurements remain.

FIG. 2B shows another embodiment of a processing system utilizing a scanning or step and scan approach to heating the top surface 201 of substrate 200 optically through flexible fiber optic cabling 225-2. A portion of the top surface 201 is exposed to radiation emitted from the output of the fiber laser assembly 226-2 and the position of the illuminated portion of the top surface 201 is changed either abruptly or smoothly during processing. The motion of the fiber optic cabling may be in two orthogonal directions allowing exposure of the entire top surface 201 of substrate 200.

Indicators of the temperature of the illuminated portion of the top surface 201 may be received by a flexible light pipe or fiber optic pyrometric receiver 235-3 which may be affixed to fiber optic cabling 225-2 such that the fiber optic pyrometric receiver 235-3 and fiber optic cabling 225-2 move together. This may be desirable to ensure the illuminated (heated) portion is monitored rather than a cooler portion of the top surface 201. Alternatively, an optical receiver 235-2 stationary relative to the chamber 205 and lid 220-2 may be used and controlled mechanically or electronically to monitor predominantly the exposed portion of top surface 201.

FIG. 2C shows still another embodiment of a processing system where the substrate 200 is moved to translate the illuminated and heated portion of the top surface 201 of substrate 200. Since the output of the fiber laser 226-3 assembly can remain stationary relative to the chamber 205 and lid 220-2, the fiber optic cabling 225-2 and the pyrometric receiver 235-3 need not be flexible. The substrate may be moved in relatively discrete steps between exposures or the substrate can be moved smoothly during a consistent exposure. The substrate may be moved or translated in the direction of the arrows and in the orthogonal direction into and out of the plane of FIG. 2C. Alternatively the substrate can be moved in the direction of the arrows and be rotated about its center.

Motion of the substrate relative to the fiber optic cabling may be provided by a combination of a motion of the substrate and a motion of the output of the fiber laser assembly. In one example the substrate may be rotated while the fiber optic assembly is translated linearly along a radius of the substrate.

The fiber optic cabling 225 shown in FIGS. 2A-2C may or may not be a portion of the doped laser cavity, but may be an undoped fiber used to transmit the light into the chamber from the laser cavity.

Figure 3A:
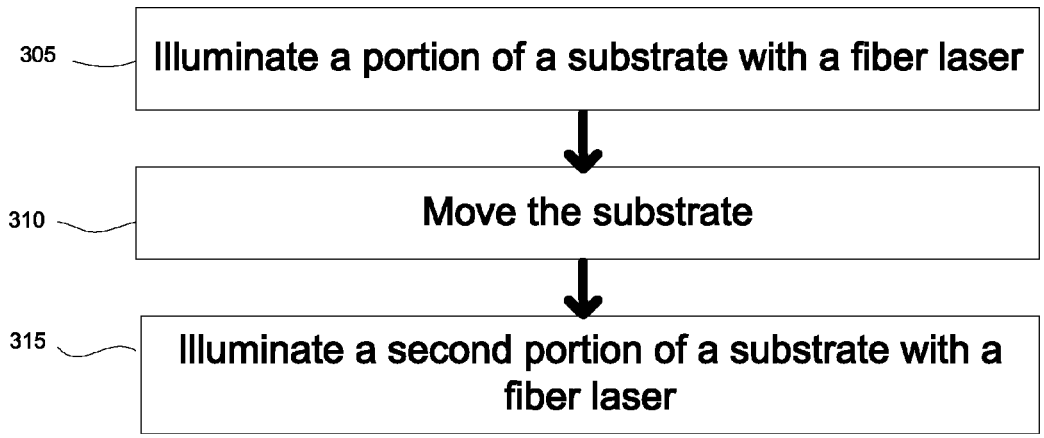
FIGS. 3A-3B are flowcharts showing exemplary methods which may be used to treat the surface of a substrate according to disclosed embodiments.
Figure 3B:
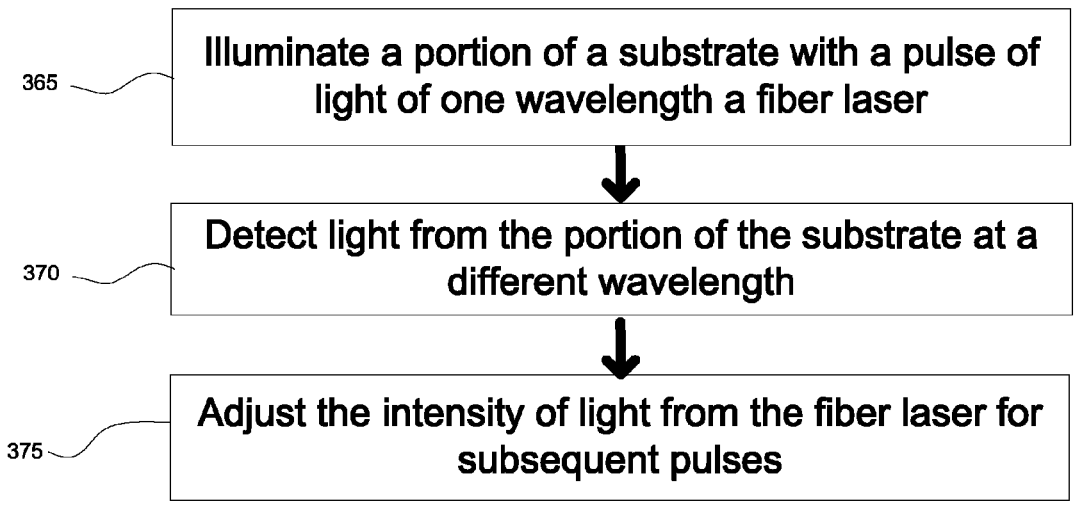

FIGS. 3A-3B are flowcharts showing exemplary methods which may be used to treat the surface of a substrate according to disclosed embodiments. FIG. 3A represents the process involved in a step and scan approach using a fiber laser. The output of a fiber laser assembly is positioned near the surface of a substrate and a pulse of light is created with the fiber laser, illuminating a portion of the substrate (operation 305). The substrate is moved so a subsequent pulse will impact a different portion of the substrate (operation 310). A second pulse of light is created with the fiber laser illuminating a second portion of the substrate (operation 315). FIG. 3B depicts a process in which an optical signal from an illuminated and heated portion is used to adjust the intensity of a pulse of light from a fiber laser. In operation 365, a portion of a substrate is illuminated and heated with a pulse of light from a monochromatic fiber laser. During or shortly after the illumination of the portion of the substrate, the intensity of light emanating from the portion is determined with a detector and used to monitor the effect of the pulse of light on the surface of the substrate (operation 370). The wavelength of the detected light is different from the wavelength produced by the fiber laser. The intensity of subsequent pulses is adjusted (operation 375) based on the intensity of the light detected in operation 370.

Exemplary Substrate Processing System

Figure 4:
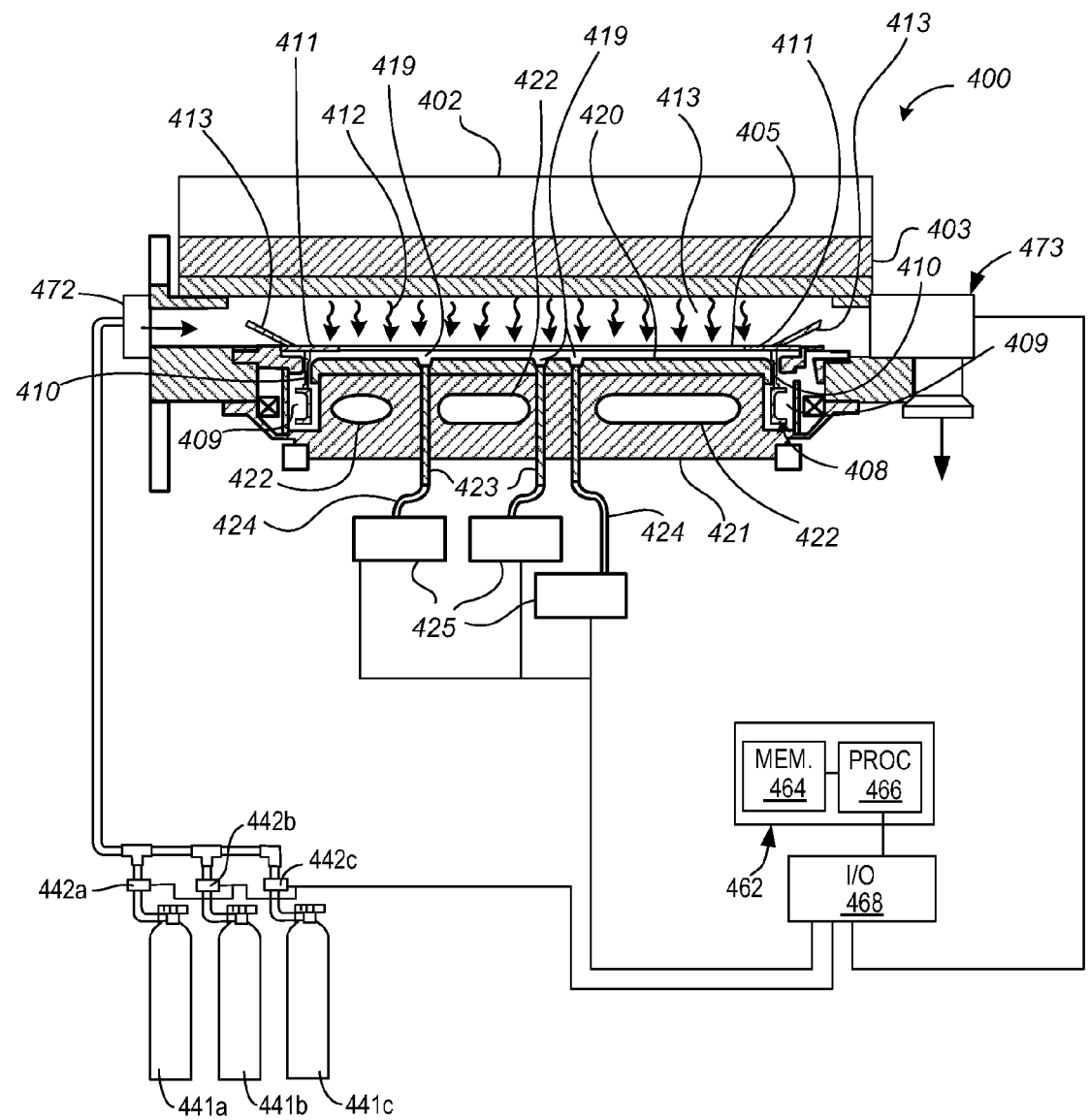
FIG. 4 is a cross-sectional view of an exemplary substrate processing system which benefits from embodiments of the invention.

FIG. 4 shows a processing chamber 400 for processing disk-shaped substrates 405 which may be twelve-inch (300 millimeter (mm)) diameter silicon (Si) wafers.

During processing, the substrate 405 is supported inside chamber 400 on a substrate support assembly 408 and is heated by illumination element 402 located directly above substrate 405, in accordance with an embodiment of the invention. Illumination element 402 generates radiation 412 which may enter processing chamber 400 through a water-cooled quartz window assembly 403. The gap between the window assembly 403 and the substrate 405 may be adjustable and is between about 10 and 50 millimeters (mm) in embodiments. Beneath substrate 405 is a reflector 420 which is mounted on a central assembly 421 having a generally cylindrical base. Reflector 420 may possess a highly reflective surface coating. The underside of substrate 405 and the top of reflector 420 border a reflecting cavity for enhancing the effective emissivity of substrate 405. The separation between substrate 405 and reflector 420 may also be adjusted. In 300 mm substrate processing systems, the gap may be between about 3 mm and 20 mm or between about 5 mm and 8 mm in different embodiments.

Multiple temperature probes (three shown in FIG. 4) may employ pyrometric methods to monitor the temperature in different regions of substrate 405 from the underside by collecting light through light pipes 423 and measuring the intensity of the detected light with optical sensors 425 and ancillary electronics. Each temperature probe may include a light pipe 423 inserted into a conduit that passes from the backside of central assembly 421 through the top of reflector 420. Light pipes 423 may be 0.080 inch in diameter and the conduits are slightly larger to facilitate insertion of light pipes 423 into the conduits. Light pipes 423 can be optically connected to optical sensors 425 via fiber optics 424. The temperature probes produce signals indicative of the measured temperature near regions of the substrate and the signals may be a system controller 462.

A processing region 413 is located above substrate 405. The substrate is modified by shining light 412 from illumination element 402 towards substrate 405 which may reorder the substrate and/or assist chemical reactions involving process gases and substrate 405. For example, dopants within the substrate 405 may be activated or dispersed, the degree of order in the substrate 405 may be increased or a film (such as a silicide, nitride or oxide) may be grown on the substrate 405. An inlet manifold 473 is positioned in the side wall of chamber 400 and is adapted to admit gas from a source of gas or gases, such as tanks 441, into the chamber 400. The flow of gases from tanks 441 are preferably independently controlled with manual valves and computer controlled flow controllers 442. An exhaust cap 473 is positioned in the side of chamber 400 diametrically opposite inlet manifold 472 and is adapted to exhaust process effluents from the deposition chamber 400 into a pumping system (not shown).

Central assembly 421 includes a circulation circuit including interior chambers 422 coupled to coolant inlets (not shown) through which a cooled fluid circulates in order to cool central assembly 421. Room temperature water is used in an embodiment to maintain central assembly 421 well below the temperature of heated substrate 405. The temperature of central assembly 421 is kept below 150 C in embodiments.

Small reflective cavities 419 may be formed in the top of reflector 420 where light pipes 423 pass through the top of the reflector 420. The light pipes 423 are positioned such that their uppermost ends are flush with or slightly below the entrance to each microcavity 419.

Light pipes 423 may be made of a high optical index material such as sapphire. Sapphire light pipes are generally preferred as they have relatively small light scattering coefficients, and they tend to have greater transverse light rejection. As a result they provide greater measurement localization because they accept incoming rays from a smaller solid angle and thus a smaller area of measurement. The light pipes can be made of any appropriate heat-tolerant and corrosion-resistant material, e.g., quartz, which can transmit the sampled radiation to the pyrometer possibly through intervening fiber optic cables 424. Alternatively, the radiation sampling system could be an optical system that includes a small-radius objective lens mounted in reflector 420 and a system of mirrors and lenses which communicate radiation collected by each lens to each pyrometer. Such a scheme may be less expensive than sapphire light pipes if appropriate off-the-shelf optical elements are available. Alternatively, light pipes can be made from a tube that has a highly polished reflective inner surface.

As indicated above, although only three temperature probes are shown in FIG. 4, an actual system may use seven or eight measurement probes distributed over reflector 420 so as to measure the temperature at different radial and azimuthal positions. During thermal processing, substrate support assembly 408 is often rotated to even the heat distribution of the substrate 405. Rotation rates may be between about 20 and 200 revolutions per minute (RPM). In cases where the substrate 405 is rotated, each probe actually samples the temperature profile of a corresponding annular ring area on the substrate. Substrate support assembly 408 may be a magnetically-levitated rotating frame. Substrate support assembly 408 may extend into a rotor well 409 while supporting the substrate 405 from the edge. In this way, substrate 405 is rotated under illuminating element 402 to promote substrate 405 temperature uniformity.

Along the inner diameter of edge ring 411 may be a shelf or wedge shape for contacting substrate 405. Edge ring 411 contacts the substrate 405 around the outer perimeter of substrate 405, thereby obscuring a minimal portion of the underside of substrate 405. Edge ring 411 has a radial width of approximately 0.75 inch. Portions of edge ring 411 are close to substrate 405 and may be subject to corroded or contaminated by process gases selected to form a film or otherwise modify substrate 405. The material used for edge ring 411 may be resistant to chemical attack such as silicon carbide.

Edge ring 411 is designed to create a light tight seal with a cylinder 410. Extending from the bottom surface of edge ring 411 is a cylindrically-shaped lip or skirt which has an outside diameter that is slightly larger or smaller than the outside diameter of cylinder 410 preventing light from traveling directly between the regions outside and inside the cylinder 410. Edge ring 411 has an outer radius that is larger than the radius of cylinder 410 so that it extends out beyond cylinder 410. This annular extension of edge ring 411 beyond cylinder 410 functions as a baffle which prevents stray light from entering reflecting cavity 419 and misinterpreted as being indicative of substrate temperature. To further reduce the possibility of stray light entering reflecting cavity 419, edge ring 411 may be coated with a material that absorbs the radiation generated by illuminating element 402 (e.g., a black or grey material such as silicon carbide). To further reduce the amount of stray light entering reflecting cavity 419, a co-rotating edge ring extension 413 may be used. Cylinder 410 may be made of quartz and may be coated with Si to further limit the intrusion of light into the reflecting cavity 419.

Processing apparatus 400 includes a system controller 462 which controls various operations of apparatus 400 such as controlling illuminating element 402 intensities, gas flows, substrate temperature, and chamber pressure. In an embodiment of the present invention the system controller 462 includes a hard disk drive (memory 464) and a processor 966. The processor contains a single board computer (SBC), analog and digital input/output boards 468 as well as mechanical interface boards.

System controller 462 controls the activities of the apparatus 400. The system controller executes system control software, which is a computer program stored in a computer-readable medium such as a memory 464. Memory 464 may be a hard disk drive, but memory 464 may also include DRAM, flash and other kinds of memory. Memory 964 may also be a combination of one or more types of memory. The computer program includes sets of instructions that dictate the timing, mixture of gases, chamber pressure, chamber temperature, lamp power levels, substrate support assembly position, and other parameters of a particular process. Of course, other computer programs such as one stored on another memory device including, for example, a floppy disk or another appropriate drive, may also be used to operate system controller 462. Input/output (I/O) devices 468, in addition to interfacing with the equipment, may include human interface devices such as an LCD monitor, a keyboard and a pointing device. System controller 462 may be connected to a network to allow remote control or monitoring of system functions. Control may also be distributed among multiple system controllers 462 which communicate over a network in order to distribute control responsibilities.

As used herein "substrate" may be a support substrate with or without layers formed thereon. The support substrate may be an insulator or a semiconductor of a variety of doping concentrations and profiles and may, for example, be a semiconductor substrate of the type used in the manufacture of integrated circuits. Use of the terms "light", "optical" and "optics" does not carry any implication that the electromagnetic radiation involved must be from the visible portion of the spectrum. The light can be of any wavelength.

In one embodiment, a substrate processing system includes one or more fiber lasers that generate optical pulses to heat a portion of a surface of the semiconductor substrate to at least 200° C. The optical pulses include one or more wavelengths of light and a selectable pulse duration, and the portion of the surface has an area greater than ten square millimeters.

In another embodiment of the substrate processing system, the optical pulses promote chemical reactions which result in the formation of a film on a surface of the semiconductor substrate.

In yet another embodiment of the substrate processing system, the optical pulses activate dopants in the semiconductor substrate.

In yet another embodiment of the substrate processing system, the optical pulses anneal the semiconductor substrate.

In yet another embodiment of the substrate processing system, the one or more fiber lasers include at least one fiber bundle laser.

In yet another embodiment of the substrate processing system, the pulse duration is between about 100 ns and about 100 μs.

In yet another embodiment of the substrate processing system, the optical pulses modify the semiconductor substrate by heating the semiconductor substrate.

In yet another embodiment of the substrate processing system, the optical pulses modify the semiconductor substrate by diffusing atoms in the semiconductor substrate.

In yet another embodiment of the substrate processing system, a repetition rate of the optical pulses is selectable. The repetition rate can be less than about 1 MHz.

In yet another embodiment of the substrate processing system, a pulse shape of the optical pulses is selectable.

In yet another embodiment of the substrate processing system, the portion of the surface is greater than one hundred square millimeters.

In yet another embodiment of the substrate processing system, the system further includes an optical pyrometry assembly to monitor radiation from the portion of the surface near a wavelength different from the one or more wavelengths of the one or more fiber lasers.

In another embodiment, a substrate processing system includes a substrate support assembly that supports a semiconductor substrate disposed within a processing chamber and an optical assembly which includes one or more fiber lasers that generate optical pulses of one or more wavelengths to heat a portion of a surface of the semiconductor substrate to at least 200° C. A pulse duration of the optical pulses is selectable and the portion of the surface has an area greater than ten square millimeters.

In yet another embodiment of the substrate processing system, the optical assembly exposes one portion of the semiconductor substrate at a time.

In yet another embodiment of the substrate processing system, the substrate support assembly is moveable relative to the one or more fiber lasers.

In yet another embodiment of the substrate processing system, the one or more fiber lasers is moveable relative to the substrate support assembly.

In another embodiment, a method of treating a semiconductor substrate includes selecting a pulse duration of at least one optical pulse that promotes a surface process, and heating to at least 200° C. a first portion of a surface of the semiconductor substrate with the at least one optical pulse of light. The one optical pulse of light includes one or more fiber laser wavelengths emitted from an output of a fiber laser assembly and the portion of the surface has an area greater than ten square millimeters.

In yet another embodiment, the method of method of treating a semiconductor substrate further includes moving the semiconductor substrate and illuminating a second portion of the surface of the semiconductor substrate.

In yet another embodiment, the method of method of treating a semiconductor substrate further includes receiving an emitted light from the first portion of a surface of the semiconductor substrate, and determining an intensity of the emitted light near a process monitoring wavelength. The process monitoring wavelength is different from the one or more fiber laser wavelengths.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A substrate processing system comprising:
 a fiber bundle laser comprising a plurality of fiber lasers each configured to generate optical pulses to heat a portion of a surface of a semiconductor substrate to at least 200° C., each of the plurality of fiber lasers having a laser cavity comprising an optical fiber with a doped core to generate the optical pulses and an undoped optical fiber to transmit the optical pulses from the doped core to the surface of the semiconductor substrate;
 wherein the optical pulses comprise one or more wavelengths of light having independently selectable pulse duration, shape, and repetition rate; and
 wherein the portion of the surface has an area greater than ten square millimeters.

2. The substrate processing system of claim 1 wherein the optical pulses promote chemical reactions between process gases and the semiconductor substrate which result in the formation of a film on a surface of the semiconductor substrate.

3. The substrate processing system of claim 1 wherein the optical pulses activate dopants in the semiconductor substrate.

4. The substrate processing system of claim 1 wherein the optical pulses anneal the semiconductor substrate.

5. The substrate processing system of claim 1 wherein the pulse duration is between about 100 ns and about 100 μs.

6. The substrate processing system of claim 1 wherein the optical pulses modify the semiconductor substrate by heating the semiconductor substrate.

7. The substrate processing system of claim 1 wherein the optical pulses modify the semiconductor substrate by diffusing atoms in the semiconductor substrate.

8. The substrate processing system of claim 1 wherein the repetition rate is less than about 1 MHz.

9. The substrate processing system of claim 1 wherein the portion of the surface is greater than one hundred square millimeters.

10. The substrate processing system of claim 1 further comprising an optical pyrometry assembly to monitor radiation from the portion of the surface near a wavelength different from the one or more wavelengths of the one or more fiber lasers.

11. A substrate processing system comprising:
a substrate support assembly that supports a semiconductor substrate disposed within a processing chamber;
an optical assembly comprising:
a fiber bundle laser comprising a plurality of fiber lasers each configured to generate optical pulses of one or more wavelengths to heat a portion of a surface of the semiconductor substrate to at least 200° C., each of the plurality of fiber lasers having a laser cavity comprising an optical fiber with a doped core to generate the optical pulses and an undoped optical fiber to transmit the optical pulses from the doped core to the surface of the semiconductor substrate, wherein the optical pulses comprise one or more wavelengths of light having independently selectable pulse duration, shape, and repetition rate, and the portion of the surface has an area greater than ten square millimeters.

12. The substrate processing system of claim 11 wherein the optical assembly exposes one portion of the semiconductor substrate at a time.

13. The substrate processing system of claim 11 wherein the substrate support assembly is moveable relative to the one or more fiber lasers.

14. The substrate processing system of claim 11 wherein the one or more fiber lasers is moveable relative to the substrate support assembly.

15. A method of treating a semiconductor substrate comprising:
independently selecting a pulse duration, shape, and repetition rate of at least one optical pulse of light that promotes a surface process;
heating to at least 200° C. a first portion of a surface of a semiconductor substrate with the at least one optical pulse of light to promote the surface process;
wherein the at least one optical pulse of light comprises one or more fiber laser wavelengths emitted from an output of a fiber laser assembly, the fiber laser assembly including a fiber bundle laser comprising a plurality of fiber lasers each having a laser cavity comprising an optical fiber with a doped core to generate the at least one optical pulse of light and an undoped optical fiber to transmit the at least one optical pulse of light from the doped core to the surface of the semiconductor substrate; and
wherein the portion of the surface has an area greater than ten square millimeters.

16. The method of claim 15 further comprising:
moving the semiconductor substrate;
illuminating a second portion of the surface of the semiconductor substrate.

17. The method of claim 15 further comprising:
receiving an emitted light from the first portion of a surface of the semiconductor substrate;
determining an intensity of the emitted light near a process monitoring wavelength, wherein the process monitoring wavelength is different from the one or more fiber laser wavelengths.

* * * * *